(12) United States Patent
Betts

(10) Patent No.: US 6,422,171 B1
(45) Date of Patent: Jul. 23, 2002

(54) TEMPERATURE INDICATING DEVICE

(75) Inventor: John Betts, Modesto, CA (US)

(73) Assignee: Deltatrak, Inc., Modesto, CA (US)

( * ) Notice: Subject to any disclaimer, the term of this patent is extended or adjusted under 35 U.S.C. 154(b) by 0 days.

(21) Appl. No.: 08/912,952

(22) Filed: Aug. 14, 1997

(51) Int. Cl.[7] ................................................ G01K 5/70
(52) U.S. Cl. ..................... 116/221; 374/106; 374/187
(58) Field of Search .......................... 116/218, 216, 116/221, 281, DIG. 10; 374/104, 106, 186, 187, 205, 206; 337/62, 79, 298, 376, 333, 343, 342, 375; 426/88

(56) References Cited

U.S. PATENT DOCUMENTS

| 406,152 A | * | 7/1889 | Sturtevant ................... 374/205 |
| 1,662,621 A | * | 3/1928 | Reichold ..................... 116/221 |
| 3,214,278 A | * | 10/1965 | Mylo ......................... 116/221 |
| 3,290,942 A | | 12/1966 | Carbaugh et al. |
| 3,622,932 A | | 11/1971 | Cunaveliss et al. |
| 3,947,758 A | | 3/1976 | Sutton |
| 4,064,827 A | | 12/1977 | Darringer et al. |
| 4,091,763 A | | 5/1978 | Snider |
| 5,076,197 A | | 12/1991 | Darringer et al. |

\* cited by examiner

Primary Examiner—Diego F.F. Gutierrez
Assistant Examiner—Andrew Hirshfeld
(74) Attorney, Agent, or Firm—Theodore J. Bielen, Jr.

(57) ABSTRACT

A temperature indicating device utilizing a housing having an exterior and an interior which includes first and second chambers. First and second chambers communicate with one another. An opening through the housing allows communication between the interior and exterior of the housing. A bimetallic element which is capable of assuming first and second configurations is positioned within the second chamber. A movable member is found in the first chamber and contacts the bimetallic elements when the bimetallic elements assumes the first configuration. A spring bias the contact between the movable member and the bimetallic element and urges movement therebetween when the bimetallic element assumes the second configuration. A signal indicates such movement by utilization of the opening between the exterior and interior of the housing.

8 Claims, 2 Drawing Sheets

TEMPERATURE INDICATING DEVICE

BACKGROUND OF THE INVENTION

The present invention relates to a novel and useful temperature indicating device.

Temperature indicators are extremely helpful in determining whether extremes of temperature have been exceeded in certain environments. It is often desirable that such indicators operate automatically and maintain a signal indicating that a temperature extreme has been exceeded long after this has occurred. In other words, would be a simple matter to have an operator periodically check such temperature indicators, rather continually checking the same or continuously monitoring the same, which can be a very expensive system.

U.S. Pat. Nos. 3,290,942, 3,622,932, 3,947,758, and 4,064,827 show temperature indicating devices in which a bimetallic element, which may be a disc, bring an indicator into view for alerting the fact that a temperature level has been reached.

U.S. Pat. No. 4,091,763 shows a temperature indicator in which a bimetallic disc is snapped into view when it passes through an opaque fluid to indicate a temperature level or extreme.

U.S. Pat. No. 5,076,197 shows a temperature indicating device in which a bimetallic disc is itself moved from a chamber and into contact with an indicator by a spring when the disc inverts.

A temperature indicator which quickly and simply signals the exceeding of the temperature extreme would be a notable advance in any industrial process where temperature is a key parameter.

SUMMARY OF THE INVENTION

In accordance with the present invention a novel and useful temperature indicating device is herein provided.

The temperature indicating device of the present invention utilizes a housing which is formed with an interior and exterior portion. The interior includes a first chamber and an adjacent second chamber which communicates with the first chamber. An opening is also provided through the housing to communicate the exterior of the housing to the interior of the housing.

A bimetallic element is also employed in the present invention and is capable of assuming a first configuration and a second configuration upon a certain change in temperature. In a particular embodiment, the bimetallic element may take the form of a disc which inverts by a snapping action from a concave to a convex configuration. Of course other bimetallic element configurations may be employed in the present invention in this regard.

A movable member is also found in the present invention and is located in the first chamber. The movable member contacts the bimetallic element while the bimetallic element assumed its first configuration prior to any temperature change. At this point, the housing also includes a wall portion which bears on the bimetallic element in the second chamber while the bimetallic element is in its second configuration. The movable member is provided with a first end portion and a second end portion, in this regard. The first end portion of the movable member contacts the bimetallic element while the second end portion of the movable member contacts spring means. The movable member may also be formed to lie in a channel within the housing which guides the movable member by the urging of the spring means. Such motion takes place when the bimetallic element assumes its second configuration, which in the case of a disc generally makes the form of an inversion of the disc. At that time, the spring means urges the movable member into relative movement between itself and the bimetallic element. The spring means may also be guided in its urging motion. In certain cases, the channel utilized for guiding the movable member may also be employed to guide the spring means.

Signal means is also found in the present invention for indicating the relative movement between the movable member and the bimetallic element. The signal means utilizes the opening which connects the exterior of the housing to the interior of the housing. A surface within the first chamber is generally aligned with the opening, but is obscured by the movable member when the bimetallic element has assumed its first configuration. Upon the assumption of the bimetallic element's second configuration, the movable member passes away from the surface and allows the surface to be viewed through the opening in the housing. Of course, the surface may be marked or colored to heighten its visibility to the user.

It may be apparent that a novel and useful temperature indicating device has been described.

It is therefore an object of the present invention to provide a temperature indicating device which is reliable and simple to operate and may be employed in remote locations.

Another object of the present invention is to provide a temperature indicating device which indicates the exceeding of an extreme of temperature and maintains that indication, although the system may again pass below both such temperature extreme.

A further object of the present invention is to provide a temperature indicating device which is relatively inexpensive to manufacture and may be reset easily after the temperature indicating device has been triggered by an extreme of temperature.

Yet another object of the present invention is to provide a temperature indicating device which includes a minimum of moving parts and is quite reliable in its operation.

The invention possesses other objects and advantages especially as concerns particular characteristics and features thereof which will become apparent as the specification continues.

Figure 1A:
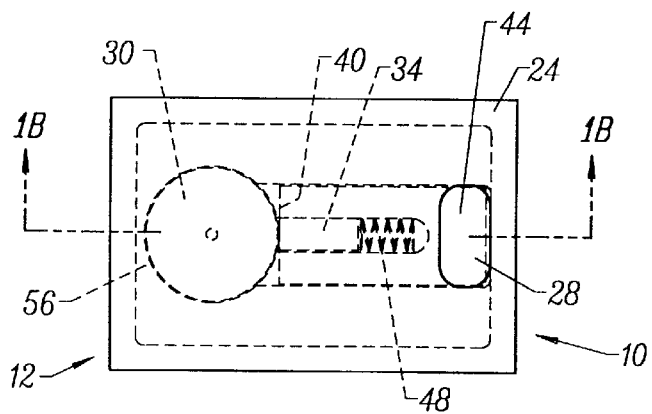
FIG. 1A is a top plan view of the device of the present invention with the bimetallic element in its first configuration, depicted in phantom.

References made to the following detailed description of the preferred embodiments thereof which should be taken in conjunction with the hereinabove described drawings.

DETAILED DESCRIPTION OF THE PREFERRED EMBODIMENTS

Various aspects of the present invention will evolve in the following detailed description of the preferred embodiments which should be referenced to the hereinabove described drawings.

The invention as a whole is shown in the drawings by reference character 10. Temperature indicating device 10 includes as one of its elements a housing 12. Housing 12 possesses an exterior 14 and an interior 16. Interior 16 is formed with first chamber 18 and connected second chamber 20. Housing 12 includes a base portion 22 and a lid 24 which lies atop ledge 26 of base 22. Lid 24 includes an opening 28 which extends from exterior 14 of housing 12 to interior 16 thereof.

Figure 1B:
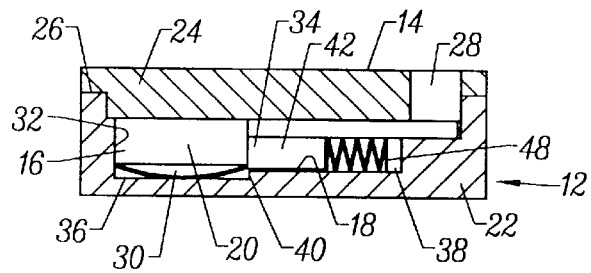
FIG. 1B is a sectional view taken along line 1B—1B of FIG. 1A.

Bimetallic element 30 is depicted in the form of a disc. Bimetallic element 30 is positioned in second chamber 20 and is capable of assuming a first configuration, concave upward in FIGS. 1A and 1B, relative to a predetermined temperature point. At a certain temperature, however, bimetallic disc 30 inverts and assumes a second configuration, FIG. 2B, concave downwardly, the significance of which will be discussed hereinafter. With reference to FIG. 1B, bimetallic disc is depicted as extending upwardly a certain distance within chamber 20 and bears against wall 32 of chamber 20. Bimetallic element is a known component in that its ability to invert at a certain temperature is understood in the art.

Movable member 34 is also illustrated in the drawings. Movable member 34, when bimetallic element is in its first configuration, bears on the edge of bimetallic element 30. It should be noted that the floor 36 of chamber 20 is slightly lower than the floor 38 of chamber 18. Thus, lip 40 is formed between chambers 18 and 20. Movable member 34 is capable of riding over lip 40, as will be discussed hereinafter. Movable member 34 includes a lower portion 42, which is generally a rectangular solid. Upper portion 44 of movable member 34 is in the form of a plate. Lower portion 42 rides in a groove or channel 46 and forms part of the periphery of chamber 18, best shown in FIG. 4. In other words, when bimetallic element is in its first configuration, FIGS. 1A, 1B, movable member 34 is in contact with bimetallic element 30 and is maintained in that position by bimetallic element 30.

Spring means 48 biases the contact between movable member 34 and bimetallic element 30. Spring means 48 may take the form of a coil spring as depicted in the drawings, however any spring configuration will suffice in this regard. Spring means 48 also lies within channel 46 holding lower portion 42 of movable member 34. Thus, movable member 34 is biased to the left as depicted in FIGS. 1A, 1B, 2A, and 2B.

Figure 2A:
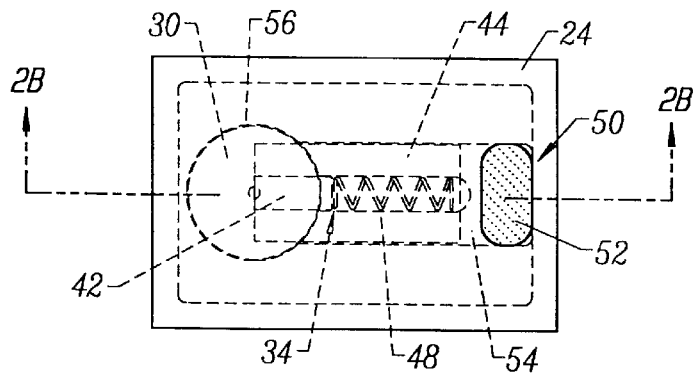
FIG. 2A is a top plan view of the device of the present invention with the bimetallic element in its second configuration, depicted in phantom.
Figure 2B:
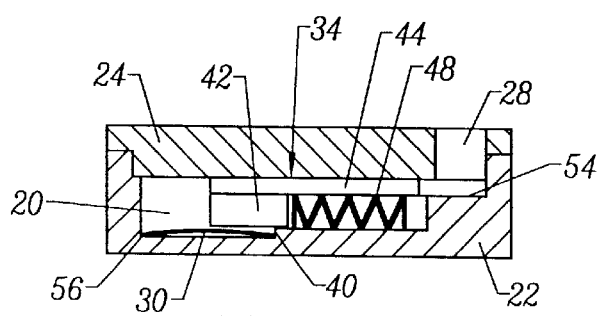
FIG. 2B is a sectional view taken along line 2B—2B of FIG. 2A.

Signal means 50 also forms part of the present invention as shown in FIG. 2A, signal means 50 takes the form of a surface indicia 52 which lies on plateau 54 that forms a portion of the walls of chamber 18. FIG. 1A indicates that indicia 52 is covered by upper portion 44 of movable member 34 prior to inversion of bimetallic element 30. FIG. 2A depicts the revealing of surface indicia 52 when movable member has been biased to the left by spring means 48 upon the inversion of bimetallic element 30. Of course, signal means 50 may take other embodiments such as surface roughness, an audio signal, and the like.

Figure 3:
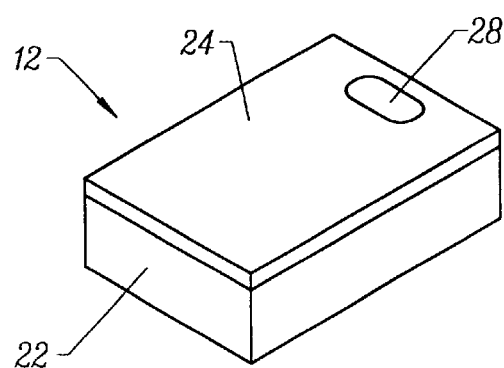
FIG. 3 is a top, right, perspective view of the temperature indicating device in its assembled state.
Figure 4:
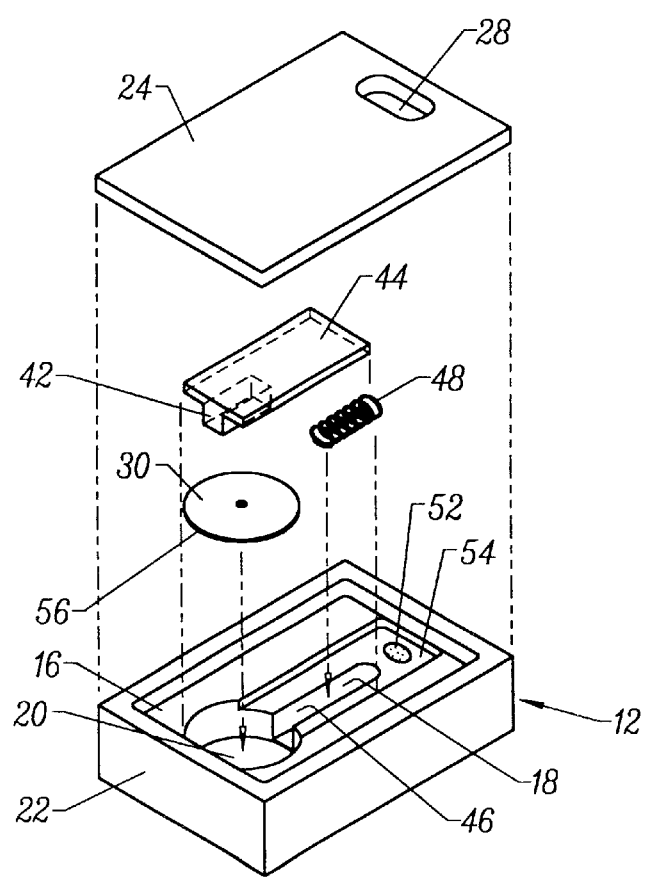
FIG. 4 is an exploded, perspective view of the temperature indicating device of the present invention.

In operation, the device 10 is assembled into the configuration shown in FIG. 3 by placement of its components as depicted in the exploded illustration of FIG. 4. That is to say, bimetallic element 30 is positioned within chamber 20 in a concave upwardly configuration, FIGS. 1A and 1B, such that edge 56 of disc lies above the top of lip 40. Lower portion 42 of movable member 34 contacts edge 56 and is held in that position by the biasing action of spring means 48. Again, FIGS. 1A and 1B depict device 10 in its "loaded" configuration. Upon reaching a certain temperature, bimetallic element 30 inverts and assumes the second configuration depicted in FIGS. 2A and 2B. In that configuration, edge 56 of disc 30 lies below the top of lip 40. Movable member 34, and in particular, lower portion 42 thereof moves to the left by the biasing action of spring means 48. In this position, upper plate portion 44 of movable member 34 slides past opening 28 revealing indicia 52 therethrough. Thus, signal means 50 is activated indicating that a certain temperature extreme has been exceeded. Subsequent inversion of bimetallic element 30 will not force movable member 34 to the right since movable member 34 has overridden disc 30. Removal of lid 24 from base 22 permits the user to reset device 10 for reuse as desired.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A temperature indicating device comprising:
   a. a housing, said housing having an exterior and an interior, said interior including a first chamber, and second chamber therewithin, said first and second chambers communicating with one another, and an opening connecting said in interior with said exterior of said housing;
   b. a bimetallic element positioned in said second chamber, said bimetallic element assuming a first configuration and a second configuration upon a change in temperature;
   c. a movable member located in said, first chamber, said movable member contacting said bimetallic element while assuming said first configuration;
   d. spring means for biasing said contact between said movable member and said bimetallic element in said first configuration, said spring means further urging relative movement between said, movable member and said bimetallic element when said bimetallic element assumes said second configuration; and
   e. signal means for indicating said relative movement between said movable member and said bimetallic element, said signal means utilizing said opening connecting said housing interior with said housing exterior, said signal means including a surface within said first chamber visible through said opening when said bimetallic element assumes said second configuration, said movable member obscuring said surface within said first chamber when said bimetallic element assumes said first configuration.

2. The device of claim 1 in which said second chamber of said housing includes a wall portion bearing on said bimetallic element in said second configuration.

3. The device of claim 1 in which said surface further includes a marking thereupon.

4. The device of claim 1 in which said bimetallic element is a disc.

5. The device of claim 1 in which said movable member includes a first end portion and a second end portion, said first end portion of said movable member contacting said bimetallic element when said bimetallic element is in said first configuration, said second end portion of said movable member contacting said spring means.

6. The device of claim 1 in which said housing further comprise a channel for guiding said movement of said movable member.

7. The device of claim 6 in which said housing further comprises a guide for said spring means.

8. The device of claim 7 in which said channel comprises said guide for said spring mean.

* * * * *